United States Patent [19]

Collette

[11] 4,287,693

[45] Sep. 8, 1981

[54] INTERLOCKING RUBBER MAT

[75] Inventor: Roderick E. Collette, Pawling, N.Y.

[73] Assignee: Pawling Rubber Corporation, Pawling, N.Y.

[21] Appl. No.: 134,057

[22] Filed: Mar. 26, 1980

[51] Int. Cl.³ .......................... B32B 3/10; E04C 1/10
[52] U.S. Cl. ........................................ 52/177; 52/302; 52/591; 428/44; 428/53; 428/55; 428/58; 428/60; 428/81; 428/155; 428/134
[58] Field of Search ...................... 428/44, 53, 55, 60, 428/58, 81, 155, 134; 52/177, 588, 591, 594, 595, 302

[56] References Cited

U.S. PATENT DOCUMENTS

| Re. 17,020 | 7/1928 | Healy | 52/593 |
|---|---|---|---|
| 792,979 | 6/1905 | Fulgham | 52/594 |
| 2,099,149 | 11/1937 | Turnquist | 72/25 |
| 2,167,195 | 7/1939 | Ash | 45/68.4 |
| 2,693,102 | 11/1954 | Luster et al. | 72/25 |
| 2,999,431 | 9/1961 | Mitchell | 94/13 |
| 3,462,181 | 8/1969 | Lewis | 287/189.36 |
| 3,657,852 | 4/1972 | Worthington et al. | 52/591 |
| 3,909,996 | 10/1975 | Ettlinger et al. | 52/177 |
| 4,018,025 | 4/1977 | Collette | 52/590 |
| 4,065,902 | 1/1978 | Lindal | 52/593 |

Primary Examiner—Paul J. Thibodeau
Attorney, Agent, or Firm—Mandeville and Schweitzer

[57] ABSTRACT

A ventilated interlocking floor tile is disclosed comprising a lower layer including a heavy, substantially solid edge region provided with a plurality of interlocks for attachment with contiguous tiles and an upper layer securely fastened to the lower layer to form an upper floor surface including a unidirectional slip-resistant tread pattern. The solid edge region defines a cavity on the backside of the tile and includes a plurality of ventilating grooves extending from the cavity to the outer edge of the tile to accommodate the flow of air to and from the cavity. The upper layer is secured to the lower layer such that the upper layer overlies the interlocks of two predetermined sides of the solid edge region of the lower layer whereby the exposed interlocks of the remaining sides of the edge region of the lower layer may only interlock with the covered interlocks of a contiguous tile thereby maintaining uniformity in the pattern defined by the unidirectional tread pattern of the upper layers throughout the floor surface covering constructed by the floor tiles.

3 Claims, 8 Drawing Figures

INTERLOCKING RUBBER MAT

BACKGROUND AND SUMMARY OF THE INVENTION

The invention is related to a ventilated interlocking floor tile and comprises an improvement over the invention of my prior U.S. Pat. No. 4,018,025 issued Apr. 19, 1977.

In the design of building entrances, lobbies, work areas and other places subject to high pedestrian traffic, it is often advantageous to provide a slip- and wear-resistant safety floor surface. To meet these requirements, molded rubber floor tiles are frequently used. In accordance with the invention of my aforementioned patent, a ventilated interlocking floor tile comprises a heavy, substantially solid edge region which includes a plurality of interlocks consisting of dove-tail-shaped projecting elements on the edge region and dove-tail slots formed therebetween. The projecting elements of each tile are aligned to be inserted into adjacently positioned dove-tail slots of a contiguous tile to form a firm interlock, resisting separation of the contiguous tiles. Moreover, the solid edge region adds strength to the floor tiles in the junction area between tiles to resist the stresses of pedestrian traffic. The substantially solid edge margin also defines a cavity on the backside of the tile to provide an open-air space beneath the floor covering to facilitate evaporation of moisture which may accumulate under the tiles. In addition, a plurality of ventilating grooves extend from the cavity to the outer perimeter of the particular tile accommodating the flow of air to and from the cavity and facilitating moisture evaporation.

It is a primary objective of the present invention to provide a new and improved ventilated interlocking floor tile of the type disclosed in my aforementioned patent, including a hidden interlock design and unidirectional tread pattern to improve the appearance and utility of a rubber floor covering. Generally, the tile comprises a lower layer including a substantially solid edge region provided with a plurality of triangular-shaped projections or connecting elements extending around the entire perimeter of the tile and dove-tail slots formed therebetween. The substantially solid edge region is molded to define a central cavity on the underside of said lower layer. The cavity includes a plurality of knob-like projections extending from the cavity wall to the floor level to support the floor surface of the tile while providing an air space within the cavity. Moreover, a plurality of grooves are formed through the substantially solid edge region and extend from the cavity to the outer perimeter of the tile to facilitate the circulation of air within the cavity.

The tile of the present invention also includes an upper layer which is integral with the lower layer. The upper surface of the upper layer is provided with a unidirectional tread pattern for slip-resistant wear and is oriented on the lower layer such that the dove-tail projections of two adjacent sides of the lower layer are exposed and the dove-tail projections of the other two adjacent sides of the lower layer are covered by the upper layer. This arrangement requires each of the individual tiles to be oriented in the floor covering such that the exposed projections of each tile interlock with the covered dove-tail slots of a contiguous tile, thereby assuring that the unidirectional tread pattern of the upper surface remains uniform throughout the floor covering. At the same time, the interlock between the exposed projections and the hidden or recessed dove-tails of the contiguous tile results in a straight-line border between tiles to improve the appearance of the floor covering.

Advantageously, the sides of the upper layer are tapered to facilitate air circulation between the tiles and into and through the grooves formed through the substantially solid edge region of the lower layer. Accordingly, any moisture which falls onto the floor will be able to seep to the underside of the tile to prevent flooding and will thereafter evaporate due to the air circulation features of the invention.

With the foregoing and additional objects in view, the invention will now be described in more detail with respect to a preferred embodiment of the invention and the accompanying drawings.

DETAILED DESCRIPTION OF A PREFERRED EMBODIMENT

Figure 1:
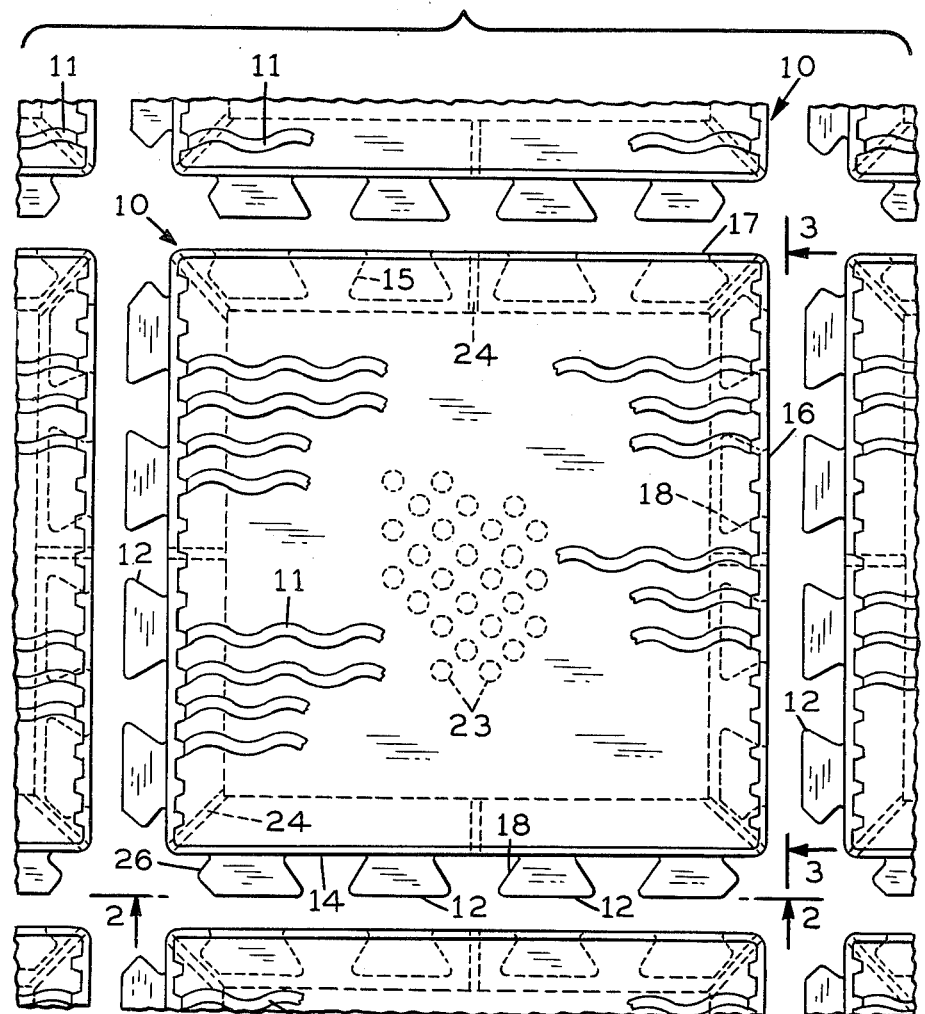
FIG. 1 is an exploded top plan view of a complete central tile, constructed in accordance with the principles of the present invention, surrounded by fragmentary parts of eight contiguous tiles of similar construction aligned with, but unconnected to, the central tile.

Referring now to the drawings, FIG. 1 shows the top view of a tile of the invention designated generally by the reference numeral 10. The tile 10 is illustrated with partial top views of eight surrounding tiles 10 of identical construction oriented for interlocking connection with the middle tile and each other to form an integrated floor covering. Each of the tiles 10 is provided with a raised tread pattern consisting of parallel spaced, generally sinusoidally-shaped rib-like projections 11 extending along the length of each tile 10. In the preferred embodiment, each tread projection 11 is approximately a quarter of an inch wide and an eighth of an inch in height. As will be described in more detail hereinafter, the tiles 10 are configured such that they may be interlocked with one another in only one orientation of each tile to maintain a uniform tread pattern throughout the floor surface covering.

In accordance with the invention, each tile 10 includes a plurality of exposed, truncated, triangular-shaped (i.e., dove-tail) side projections 12 spaced along two adjacent sides 13, 14 of the tile 10 and a plurality of similarly shaped recessed connecting elements 15 spaced along the other two adjacent sides 16, 17 of the tile 10. The projections 12 and connecting elements 15 define dove-tail slots 18 therebetween whereby the projections 12 or connecting elements 15 may be interconnected with aligned dove-tail slots 18 of a contiguous tile 10 to fasten the tiles 10 together to form an integrated floor covering.

Figure 2:
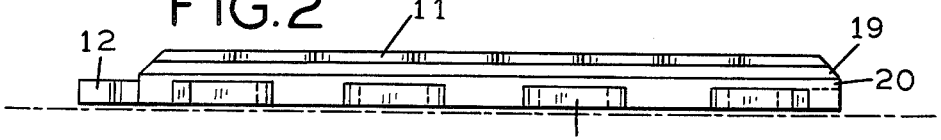
FIG. 2 is a side view of the central tile of FIG. 1, taken generally along line 2—2 of FIG. 1.
Figure 3:
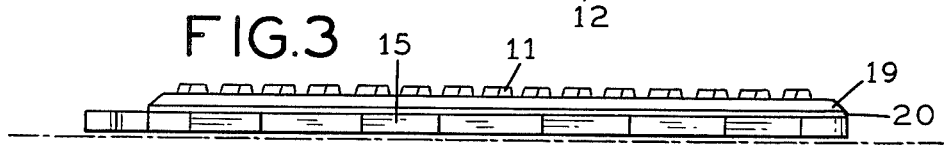
FIG. 3 is another side view of the central tile of FIG. 1, taken generally along line 3—3 of FIG. 1.
Figure 4:
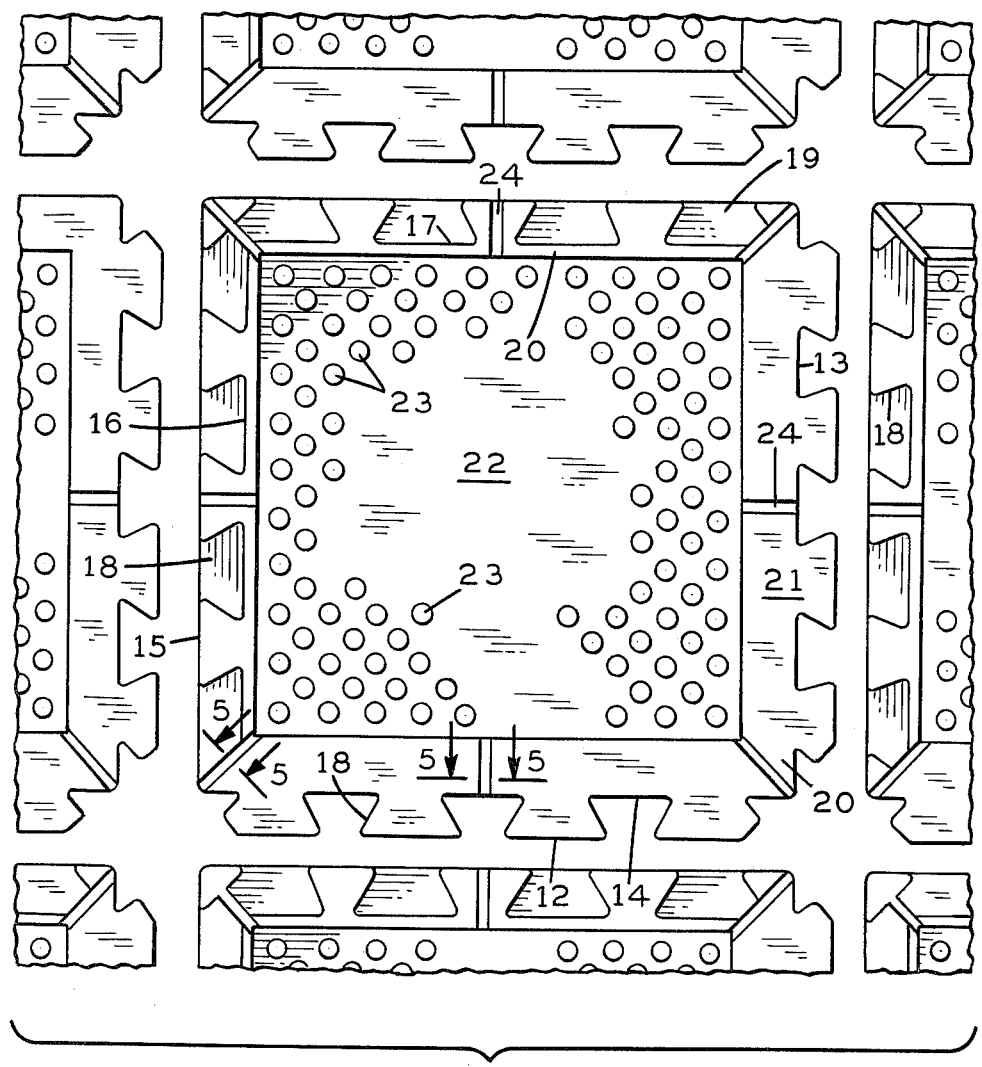
FIG. 4 is a bottom plan view of the tiles of FIG. 1.

Referring now to FIGS. 2–4, it may be seen that each tile 10 comprises an upper layer 19 and a lower layer 20 integrally joined therewith. The lower layer 20 comprises a heavy edge region 21 extending along the entire outer perimeter thereof, with the projections 12 being integral with and extending from the sides 13, 14 of the edge region 21 and the similar connecting elements 15 being integral with and extending from the sides 16, 17 of the edge region 21. Moreover, the heavy edge region 21 defines a central cavity 22 on the backside of the lower layer 20. To advantage, the height of the cavity 22 may be approximately a quarter of an inch to provide an air space below the floor covering sufficient to facilitate ventilation for evaporation of moisture which may become trapped under the floor tile, as will appear. The cavity 22 is provided with a large plurality of knob-like projections 23 spaced across the entire surface of the cavity 22. Each of the projections 23 is in the form of a truncated cone and extends from the upper wall of the cavity 22 to floor level. In a typical tile, according to the present invention, each of the projections 23 is approximately a quarter of an inch in diameter and the projections 23 are spaced within the cavity 22 such that there are approximately two projections 23 per square inch. The size and number of projections 23 will provide firm upward support for the surface of the tile 10 and add strength and resiliency to the overall tile while leaving sufficient air space within the cavity 22 to facilitate ventilation moisture evaporation.

Though not critical to the present invention, each of the tiles 10 may be formed into a square configuration measuring approximately 12 inches × 12 inches with the sides 13, 14 of the edge region 21 being approximately one inch wide and the sides 16, 17 being approximately a quarter of an inch in width. In this manner, the cavity 22 is slightly offset with respect to the upper surface defined by the lower layer 20. The upper layer 19 is joined to the lower layer 20 such that the outer perimeter thereof along sides 16, 17 of the tile 10 extend slightly beyond the outer ends of the connecting elements 15 to thereby cover the connecting elements 15 and define recessed dove-tail slots 18 along sides 16, 17 of the tile. The other two adjacent sides of the upper layer 19 are arranged to coincide with the sides 13, 14 of the lower layer 20 whereby the projections 12 of the tile 10 are fully exposed when the tile 10 is removed from the floor covering. Accordingly, the projections 12 of sides 13, 14 of each tile 10 may only be interconnected with recessed dove-tail slots 18 of a contiguous tile 10 and the array of exposed projections 12 along two adjacent sides of each tile 10 requires the tile to be placed into the floor covering in such manner that the unidirectional tread pattern of the upper layers 19 will form a uniform pattern throughout the floor covering. Moreover, when the tiles 10 are interlocked with one another, the exposed projections 12 of each tile 10 will be hidden within the recessed dove-tail slots 18 of the contiguous tile 10 to thereby hide the tile interlock from view and form an apparent straight-line border between the tiles 10.

Figure 5:
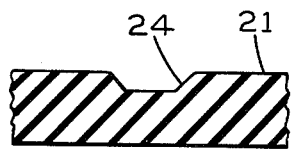
FIG. 5 is a partial cross sectional view taken along line 5—5 of FIG. 4.

To advantage, the edge region 21 of each tile 10 is provided with a plurality of passageway grooves 24 extending from the cavity 22 to the outer perimeter of the tile 10. In the preferred embodiment, each of the passageway grooves 24 is of a generally trough-shaped cross sectional configuration, as illustrated in FIG. 5, and is approximately a quarter of an inch in width at its narrowest portion, with the sides thereof flaring outwardly to approximately one-half inch in width at its widest portion. The passageway grooves 24 permit the relatively free circulation of air from the cavity 22 to the outer perimeter of the tile 10 or to the cavity 22 of a contiguous tile 10.

In accordance with a specific feature of the invention, the side edges 25 of the upper layer 19 are beveled to form a slight taper from the top surface of the upper layer 19 to the junction area between the upper and lower layers 19, 20 along the full outer perimeter of the tile 10. Moreover, the corner portion of both the upper and lower layers 19, 20 are rounded. These features form an advantageous structure for drainage and ventilation of the tile undersides, when the tiles are interlocked in a completed floor covering, as will appear.

Figure 6:
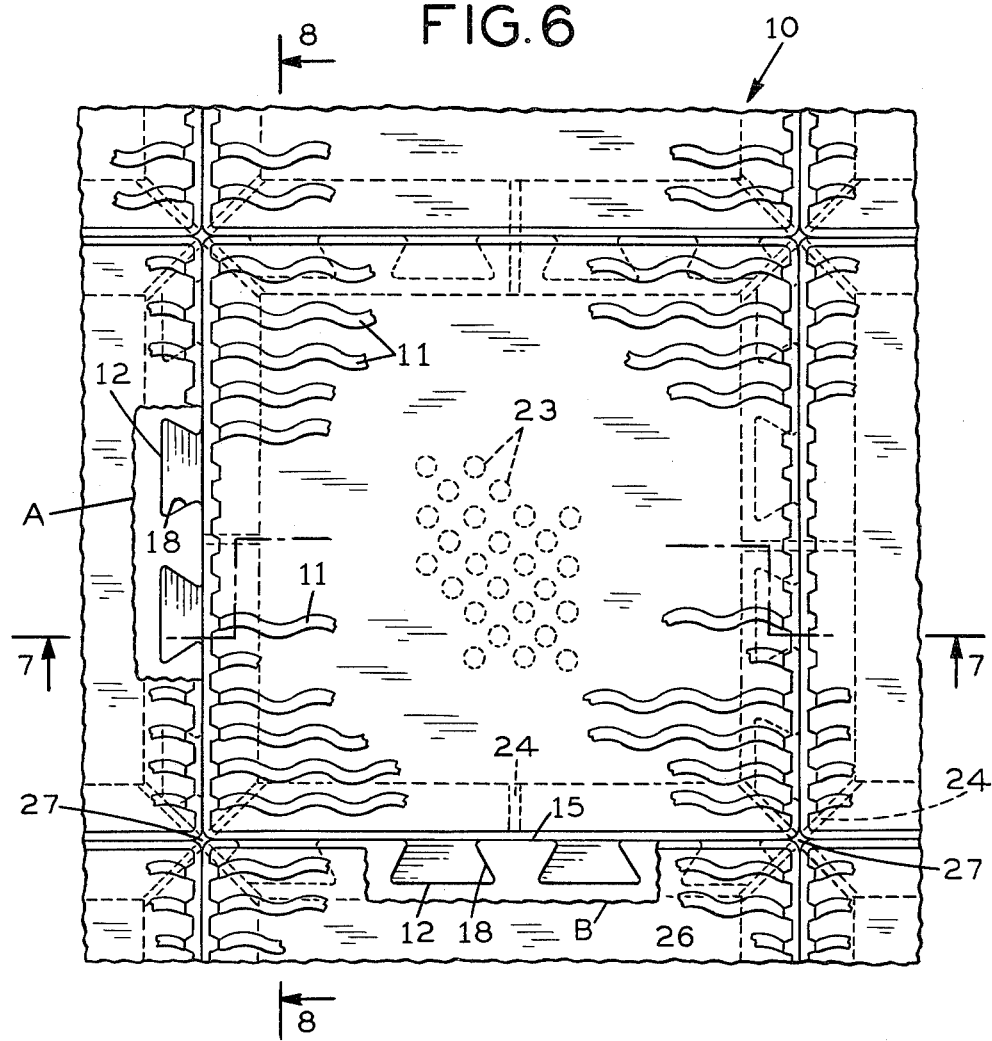
FIG. 6 illustrates the tiles of FIG. 1 in an interlocked relationship.
Figure 7:
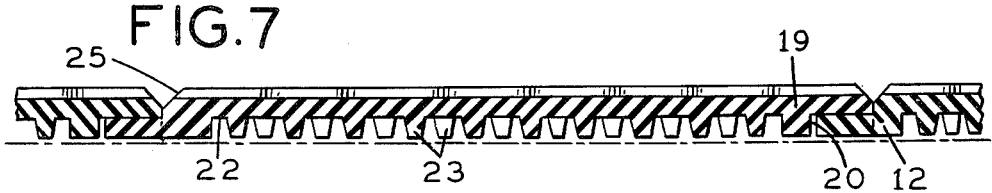
FIG. 7 is a side cross sectional view of the tiles of FIG. 6, taken generally along line 7—7 of FIG. 6.
Figure 8:
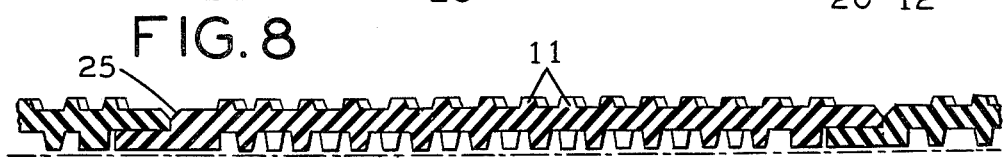
FIG. 8 is a side cross sectional view of the tiles of FIG. 6, taken generally along line 8—8 of FIG. 6.

Referring now to FIGS. 6–8, the tiles 10 previously described are illustrated as they are arranged in a floor covering. Each of the projections 12 are received within and tightly interlocked with a complementary, recessed dove-tail slot 18. This is shown in the areas marked A and B on FIG. 6, in which the upper layer 19 is cut away. Accordingly, the beveled side edges 25 of the upper layers 19 define straight-line borders between adjacent tiles 10 and the beveled configuration of the side edges 25 define generally V-shaped channels at the tile borders. The channels facilitate drainage of liquids which may be spilled onto or accumulate on the floor covering. Such liquids may seep into the channel and between the tiles to the cavity 22. As described above, the air circulation within the cavity 22 will tend with time to evaporate the moisture to prevent the adverse effect thereof, such as corrosion and mildew.

In accordance with another feature of the invention, the projections 12 and connecting elements 15 nearest the corners of each tile 10 include a truncated corner 26. Moreover, a passageway groove 24 is formed at each corner of the tile 10 extending from the cavity 22 to the complementary rounded corner of the tile 10. When the tiles are interlocked, the rounded corners of four adjacent tiles 10 define an open space 27 communicating with the corner passageway grooves 24 to improve air circulation under the tiles 10. The truncated sides 26 of the projections 12 and elements 15 are arranged to extend closely adjacent to the corner passageway grooves 24 of an adjacent interlocked tile 10. Accordingly, the interlocks formed by the truncated projections 12 and elements 15 may be placed in a close proximity to the corners of the tiles 10 to strengthen the interlock at the corner junctions.

Inasmuch as the corner junction requires the firm locking of four tiles, it is particularly important that the interlocking elements are in close proximity to the corner areas. The truncated configuration for the projections 12 and connecting elements 15 in accordance with the teachings of the present invention provides for a firm interlock at the corner junctions while accommodating improved air circulation features of the corner passageway grooves 24 and corner open spaces 27.

Thus, the ventilated interlocking floor tile of the present invention provides several novel features to greatly improve their efficacy in their end use as a component of a floor surface covering. The hidden interlock design improves the appearance of the floor covering while the unique configuration of having exposed projections on two adjacent sides of the tile and hidden dove-tail slots on the other two adjacent sides of the tile serves to orient each tile in a particular alignment with adjacent tiles to maintain uniformity for a traction tread pattern across the entire floor covering. Moreover, the truncated interlock elements permit a firm connection between the tiles at the critical corner junctions while facilitating the highly advantageous air circulation features of the invention.

The particular ventilated floor tile described herein is the preferred embodiment of the invention and it should be understood that the invention is not limited to that particular arrangement. Accordingly, as should be appreciated and understood by those skilled in the art, changes may be made therein without departing from the scope of the invention which is defined in the following appended claims.

I claim:

1. A ventilated, interlocking floor tile, which comprises
   (a) a lower layer including a heavy, substantially solid edge region, the periphery of said edge region being provided with a plurality of interlocks to interconnect said tile with contiguous tiles whereby a floor surface covering can be constructed,
   (b) said interlocks comprising dovetail projecting elements extending from said edge region and alternating dovetail slots formed thereby,
   (c) said projecting elements interlocking with adjacently positioned dovetail slots of a contiguous tile,
   (d) said lower layer including an inner region formed by said heavy, substantially solid edge region and defining a cavity,
   (e) said heavy, substantially solid edge region including a plurality of ventilating grooves extending from the cavity to the edges of said floor tile to accommodate the flow of air to and from said cavity, and
   (f) an upper layer joined with said lower layer and forming an upper floor surface,
   (g) said upper floor surface including a unidirectional slip-resistant tread pattern,
   (h) said upper layer being secured to said lower layer such that said upper layer overlies the projecting elements of two predetermined sides of said substantially solid edge region of the lower layer, whereby the remaining exposed projecting elements may only interlock with the dovetail slots defined by the covered projecting elements of a contiguous tile thereby maintaining uniformity in the pattern defined by the unidirectional tread patterns of said upper layer throughout the floor surface covering constructed from said floor tiles,
   (i) said heavy edge region including at least one corner ventilating groove extending from said cavity to the tile corner,
   (j) said tile corners being rounded to define an open space between contiguous tiles to accommodate the flow of air to and from said cavity,
   (k) each of said projecting elements positioned adjacent the corners of each tile including a truncated side arranged and configured to lie closely adjacent the corner ventilating groove of a contiguous tile when said tiles are in an interlocked relationship, whereby the projecting element may be positioned in close proximity to the corner of said tile while accommodating said corner ventilating groove.

2. The ventilated interlocking floor tile according to claim 1, further characterized by
   (a) the side edges of said upper layer being of a beveled construction to define generally V-shaped channels at the tile borders when the tile is in an interlocking relation with contiguous tiles.

3. The ventilated interlocking floor tile according to claim 1, further characterized by
   (a) said upper layer overlying the projecting elements of two adjacent sides of said substantially solid edge region.

* * * * *